No. 617,035. Patented Jan. 3, 1899.
B. METCALF.
WATER RESERVOIR AND COOLER.
(Application filed Jan. 10, 1898.)
(No Model.) 2 Sheets—Sheet 1.
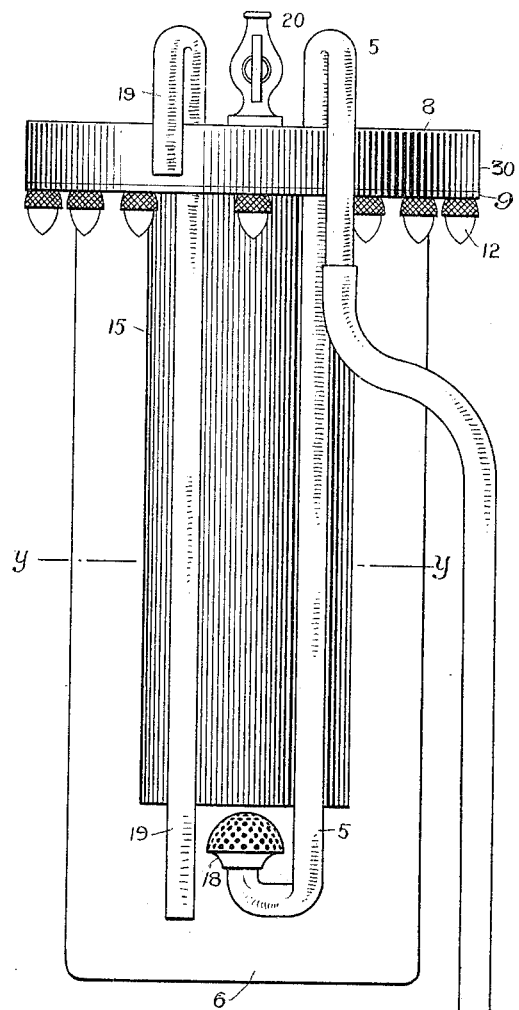
Fig. 1.
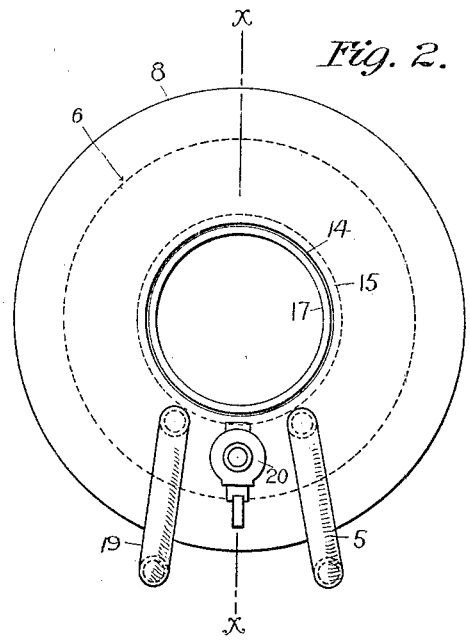
Fig. 2.
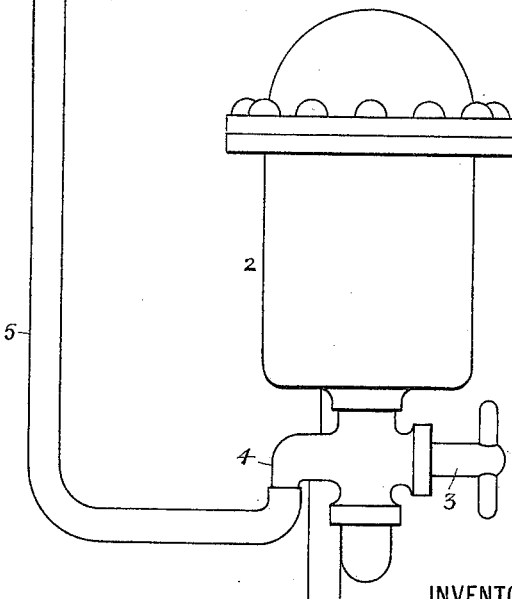
WITNESSES:
Frank S. Ober
A. M. Hayes
INVENTOR
Bryce Metcalf.
BY
Fowler & Fowler
ATTORNEYS.

No. 617,035. Patented Jan. 3, 1899.
B. METCALF.
WATER RESERVOIR AND COOLER.
(Application filed Jan. 10, 1898.)
(No Model.) 2 Sheets—Sheet 2.

WITNESSES:
Frank S. Oliver
A. M. Hayes

INVENTOR
Bryce Metcalf,
BY
Fowler & Fowler
ATTORNEYS.

UNITED STATES PATENT OFFICE.

BRYCE METCALF, OF NEW YORK, N. Y., ASSIGNOR TO THE WEIR FILTER COMPANY, OF SAME PLACE.

WATER RESERVOIR AND COOLER.

SPECIFICATION forming part of Letters Patent No. 617,035, dated January 3, 1899.

Application filed January 10, 1898. Serial No. 666,147. (No model.)

*To all whom it may concern:*

Be it known that I, BRYCE METCALF, a citizen of the United States, residing in the city, county, and State of New York, have invented certain new and useful Improvements in Water Reservoirs and Coolers, of which the following is such a full, clear, and exact description as will enable any one skilled in the art to which it appertains to make and use the same, reference being had to the accompanying drawings, forming part of this specification.

My invention relates to a storage-receptacle and cooler for water, and it is particularly well adapted for use in conjunction with water filtering and aerating apparatus operating upon the principle of that set forth in United States Letters Patent No. 516,140, granted March 6, 1894, to William Weir, for improvements in filters.

The principal objects of the invention are to provide a simple and efficient device which will serve as a storage-reservoir for the filtered and aerated water and from which such water may be quickly drawn immediately upon opening the supply-pipe to the filter; and a further object is to cool the aerated water by means of ice or other suitable agent.

To these ends my invention consists in the various novel and peculiar arrangements and combinations of the several parts of the device, all as hereinafter fully described and then pointed out in the claims.

I have illustrated a type of my invention in the accompanying drawings, wherein—

Figure 3:
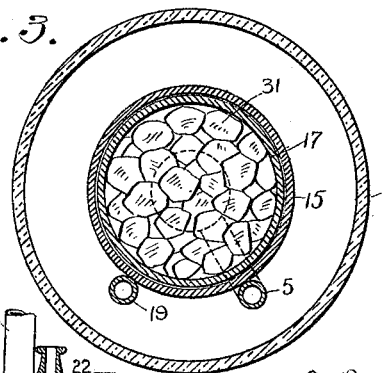
Figures 4, 5:
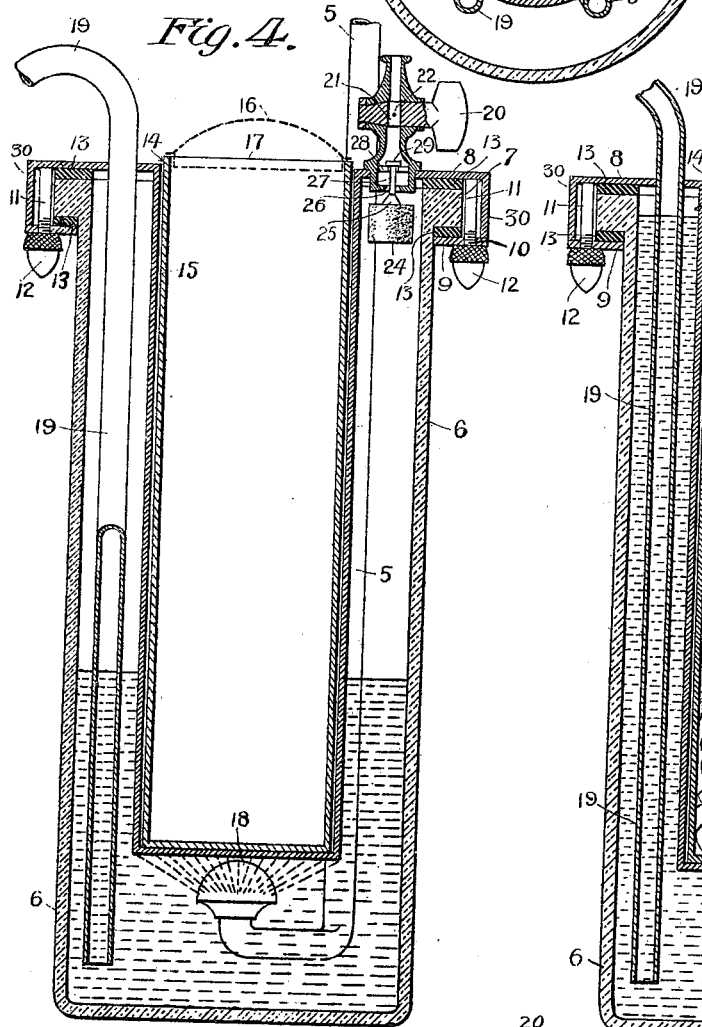
Figure 6:
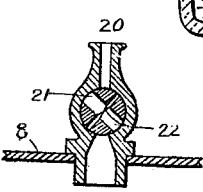

Figure 1 is a side view of my improved device with the cover of the ice-chamber omitted, together with an aerating-filter with which it is connected. Fig. 2 is a plan view of my improved cooler or reservoir detached with the ice-chamber cover omitted. Fig. 3 is a view of a horizontal section of the device, taken on line *y y*, Fig. 1. Figs. 4 and 5 are each views of a central vertical section of the device, taken on a plane indicated by line *x x*, Fig. 2, but with the air-vent in a different adjustment in the respective views, one of which shows the containing vessel as filling, while the other shows it as filled. Fig. 6 is a detail view of the two-way cock or valve, shown as adjusted in closed position.

Referring to the drawings, in which like numbers of reference indicate like parts throughout, 2 is a water filtering and aerating apparatus of the character set forth in the hereinbefore-mentioned patent, No. 516,140, of William Weir, and to which reference may be had for a fuller understanding thereof. However, for the purposes of my invention it will suffice to know that the filtered water delivered from said patented apparatus is highly aerated, and when the supply of the filter is turned on to obtain therefrom the filtered water there is a large discharge of air from the faucet before the water flows, due to the contained air in the then empty filter being driven out ahead of the water, the filter emptying itself of water automatically after the supply-pipe is closed. The supply-pipe of the filter 2 is controlled by a cock 3, which when open causes the water to pass through the apparatus and to be delivered therefrom at 4 as filtered and aerated water—that is, aerated in the sense that the water is impregnated with or has suspended therein air.

The pipe 5 leads from the discharge 4 of the filter and serves as the supply-pipe for my improved apparatus, which is designed to be used either as a storage-receptacle or reservoir for the aerated filtered water or as a combined cooler and reservoir.

My apparatus comprises a closed containing vessel 6, which is preferably made of glass and which is here shown in cylindrical form, though it may of course assume any desirable shape. The top of the vessel or jar 6 is formed with an annular flange 7, and its mouth is sealed air-tight by a cap or cover 8, which is circular in shape, conforming to the shape of the vessel, and has its edge provided with a downwardly-projecting flange 30, which conceals the edge of the jar and gives a neat appearance to the device. A metal ring 9 surrounds the vessel beneath its flange 7 and is provided with perforations 10 for the passage through it of the threaded bolts 11, which extend down from the cap 8 at suitable intervals and through the openings in the ring 9, beneath which they are provided with ornamental nuts 12 for clamping the cap to the top of the vessel, suitable gaskets 13 13 being interposed between the cap and vessel, likewise the ring and vessel, to perfect the seal.

From a central opening 14 in the cover 8 of the vessel depends an ice chamber or pocket 15, which is open only at its top, where it is secured in the opening in the cap by an air-tight joint. This chamber 15 is of cylindrical shape and, like the cap, is made of a suitable metal and extends down well within the closed vessel nearly to the bottom thereof, and there is a free annular space between its sides and the interior of the vessel, so that when a cooling agent, such as ice 31, is placed within the chamber 15 the surrounding water may be rapidly cooled. This chamber 15 is provided with a suitable cover 16 for closing it. In order to facilitate a renewal of the ice or cooling agent as well as for other obvious reasons, I provide the chamber 15 with a removable receptacle 17, which is made of suitable metal and similar in shape to the part 15, with a slightly smaller diameter in order to fit snugly within it. This receptacle 17 can be readily removed from the part 15 in order to empty it of its contents when desired and clean it without disturbing the other parts of the apparatus.

The supply-pipe 5 of my apparatus passes in through the cap 8 by an air-tight joint and extends down to near the bottom of the vessel, where it curves upwardly immediately underneath the cooling-chamber 15 and is there provided with a rose or sprayer 18 for dividing up the stream of injected water, which is heavily charged with air, so that such air is broken up into small bubbles. At the same time the sprayer distributes the water over the bottom of the cooling-chamber 15 and causes it to cool more rapidly. The discharge-pipe 19 extends from near the bottom of the vessel 6 up through the cap 8 by an air-tight joint and is brought around over to one side of the vessel, and it is from this pipe that the water is received whenever it is desired to take any from the apparatus. The discharge-pipe of the closed vessel is so arranged as to draw the water from the lower part of the vessel and raise it up to or above the top thereof, the top of the vessel being equivalent to the maximum level attained by the water therein.

The closed containing vessel 6 is provided with a two-way valve or cock 20, which is located in the cap 8, one of the openings 21 thereof being large and the other opening 22 being comparatively small or minute. (See Figs. 4, 5 and 6.) The passage 23, leading from the vessel to the cock 20, is controlled by an automatic valve or float 24, which is carried up by the water into position to close said passage when the water reaches its highest level in the vessel. This valve 24 is provided with a conical extension 25, which acts upon the valve-seat 26, and from this conical portion projects upwardly through the valve-seat a guide-stem 27, which works loosely through an opening in a cross-piece 28, above which the stem is provided with a head 29 for retaining the valve in working position when the water falls away from it.

From the foregoing description the use and operation of my apparatus will be readily understood. The containing vessel 6 being empty, the cock 20 is adjusted so that the larger vent 21 thereof is open, and at such time the automatic valve 24 is also open. The cock 3, supplying the filter, is now opened, and the aerated filtered water is thereby let into the vessel 6 by the pipe 5, and the large vent 20 being now open such water continues to flow in freely until the vessel is filled, whereupon the valve 24 automatically closes the air-vent, and under this condition the containing vessel 6 is practically air-tight. If now the supply-cock 3 of the filter is shut off immediately upon the filling of the vessel 6, no water will be discharged from the pipe 19; but if the filter-cock 3 be left open the water will flow from the discharge 19 with the same pressure and at the same rate as it enters the vessel. After the vessel 6 is thus filled the filter-cock is shut off and the apparatus is in condition for use, and the two-way cock 20 is then adjusted so as to shut off the large vent 21 and open the smaller vent 22. Under this condition when it is desired to draw a quantity of water from the discharge 19 the filter-cock 3 is turned on, and when the requisite amount of water has been drawn the filter-cock is then shut off, and this operation is repeated whenever it is desired to draw water. In thus operating it is soon found that as the water coming from the filter contains a large quantity of suspended air and as such filter drives out from it ahead of the water a large quantity of air whenever the filter is turned on the injection of this air into the body of water filling the closed vessel 6 acts upon the body of water therein contained with such force as to spasmodically displace a considerable quantity of water, which for the moment is ejected from the discharge-pipe at a greater pressure than is the water flowing therefrom at any other time. In order for the water to recover its maximum level and fill the vessel 6, I provide an air-vent which will permit but a gradual escape of the air from above the water as the latter rises in the vessel when next supplied thereto from the filter. The design and purpose of such means are to bring about a requisite differential flow between the supply and outlet to the closed vessel 6—that is to say, when the water falls in the vessel in order for it to recover its maximum level the flow of the supply-water must exceed that of the discharge. This differential flow may be produced in any way suitable. I accomplish it by permitting a slight compression of air in the top of the vessel, which is done by restricting the escape of air from the top as the water rises. The particular means I show for doing this is a minute or comparatively small air-vent 22, though of course any other well-known means may be utilized for this purpose.

As the water falls in the vessel the automatic valve opens and the space above the water is filled with air, which, being unable to freely escape, (as its only exit is the minute opening in the air-vent,) is slightly compressed by the subsequent rising of the water when the supply is turned on, this compression being sufficient to expel the water from the discharge in a somewhat less quantity than the inflow. It is now obvious that even though the water falls considerably below its maximum level yet the operation of my apparatus is not materially effected or made temporarily inoperative, since by my peculiar arrangement of bringing about a differential flow under this condition I am enabled to continue to draw quantities of water from the discharge 19, for the water in the containing vessel when so drawn upon either fills the vessel or stands at a level below its maximum level, under either of which conditions a quantity of water will immediately flow from the discharge 19 as soon as the supply is turned on. This feature is an important advantage of my invention, for where the device is in constant use and the water must be drawn from it quickly there is no cessation or pause in the discharge-flow, which responds immediately upon the opening of the supply.

The automatic valve or float 24 may be dispensed with and the device can be operated by turning the cock 20 into an intermediate position, (shown in Fig. 6,) so as to close the vent entirely. Under this condition the containing vessel is air-tight, and in drawing off the water the incoming air from the supply gradually accumulates in the upper part of the vessel, so that the water continues to fall therein until its lowest level is reached and the end of the discharge-pipe is uncovered. When this occurs, the user turns the cock 20 to open the air-vent, at the same time turning on the supply at the filter, and allows the vessel to fill, (which it readily does as the vent is now open,) whereupon he turns the cock 20 and closes the vent, so that when the next quantity of water is to be drawn it will at once be delivered without any delay. I find that the apparatus used in this way is efficient, and in this form also the cooling device or ice-chamber may be present or not. The invention contemplates the use of this form.

I sometimes use rubber tubing for the outer section of the supply-pipe 5, which tubing is attached to the metallic pipe 4 of the filter, while the inner portion is a metallic pipe; but I prefer to make the entire pipe of metal.

The discharge-pipe 19 is preferably extended down into the vessel 6 nearly to the bottom thereof in order to take the water from the coldest place. However, this pipe may be shortened, if desired; but in order to cause an immediate flow of water from the discharge when the supply is turned on the pipe is extended down below the lowest level that can be reached by the water in the vessel 6 during the operation of the device. Another advantage in having the discharge-pipe 19 extend to a low point within the vessel 6 is that it thereby permits of the contents of the vessel being readily withdrawn, when desired for cleansing purposes, by attaching to its outer end a piece of rubber tubing of sufficient length to drop down below the level of the inner end of pipe 19, so as to form a siphon, with its longer leg upon the outside of the apparatus, to siphon out the contents of the vessel.

As already stated and as will be noted from the claims hereinafter made, my invention does not necessarily include the cooling device for the water. On the contrary, the cooling device may be omitted and the apparatus may be put to good use as a reservoir or storage-receptacle for aerated water, and in such capacity it will be found particularly well adapted for use in conjunction with the Weir filter hereinbefore mentioned. The containing vessel may be made of any suitable material and of any desired shape, though I have recommended the use of glass preferably, for the reason that with a colorless glass vessel the body of water therein is visible, and as it contains suspended air the bubbles of air are also clearly seen, and this gives the device an attractive appearance, and particularly so when the charge of air is suddenly introduced into the lower part of the body of water, and breaking up into various-sized bubbles passes rapidly up through the column of water and violently agitates it, this display taking place each time that the supply is turned on in drawing the water.

I wish to be understood as not limiting my invention to the particular construction of the parts as herein set forth, as it is evident that various modifications may be made in the same without departing from the spirit of the invention.

Having thus described my invention, what I claim, and desire to secure by Letters Patent, is—

1. The combination of a containing vessel for aerated water and a suitable supply for said vessel, pipe connections for drawing the water from below its maximum level and raising it to or above said level for discharging it, means for causing a differential flow between the supply and discharge when the water falls below its maximum level, whereby in drawing water at such time the water flows into the vessel faster than it flows out and the vessel is thereby caused to fill.

2. The combination of a closed containing vessel for aerated water and a suitable supply for said vessel, pipe connections for drawing the water from below its maximum level and raising it to or above said level for discharging it, the said closed vessel being provided with an air-vent adapted to permit a gradual escape of the air above the water when it falls below the maximum level and is rising when the supply is open and water is being drawn from the discharge-pipe, whereby a differential flow is obtained between the supply and discharge and the vessel is thereby caused to fill.

3. The combination of a closed containing vessel for aerated water and a suitable supply for said vessel, pipe connections for drawing the water from below its maximum level and raising it to or above said level for discharging it, the said closed vessel being provided with an air-vent adapted to permit a gradual escape of the air above the water when it falls below the maximum level and is rising when the supply is open and water is being drawn from the discharge-pipe, whereby a differential flow is obtained between the supply and discharge and the vessel is thereby caused to fill, and an automatic valve for closing said air-vent when the vessel is filled to its top or maximum level of the water.

4. The combination of a containing vessel for aerated water and a suitable supply for said vessel, pipe connections for drawing the water from below its maximum level and raising it to or above said level for discharging it, a cooling or ice chamber having its exterior in contact with the water contained in said vessel for cooling the water, and means for causing a differential flow between the supply and discharge when the water falls below its maximum level, whereby in drawing water at such time the water flows into the vessel faster than it flows out and the vessel is thereby caused to fill and the water is maintained in contact with said cooling device.

5. The combination of a closed containing vessel for aerated water and a suitable supply for said vessel, pipe connections for drawing the water from below its maximum level and raising it to or above said level for discharging it, the said closed vessel being provided with an adjustable two-way air-vent having one of the ways comparatively small to permit a gradual escape of air, and an automatic valve for closing the passage between said air-vent and vessel when the latter is filled with water, substantially as and for the purpose set forth.

6. The combination of a closed containing vessel 6 provided with a water-supply 5, pipe connections 19 for drawing the water from below its maximum level and raising it to or above said level for discharging it, an air-vent adapted to permit a gradual escape of air from the vessel when the water is rising to its maximum level, and a valve for automatically closing said air-vent when the water reaches its maximum level, whereby a differential flow is effected between the supply and discharge, substantially as and for the purpose set forth.

In testimony whereof I have hereunto set my hand this 4th day of January, 1898, in presence of the two subscribing witnesses.

BRYCE METCALF.

Witnesses:
A. M. HAYES,
WILLIS FOWLER.